(12) United States Patent
Yu et al.

(10) Patent No.: US 6,384,530 B1
(45) Date of Patent: May 7, 2002

(54) FILL FOR HIGH TEMPERATURE TUNGSTEN-HALOGEN LAMPS

(75) Inventors: Thomas H. Yu, Richmond Heights; Richard H. Holcomb, Chagrin Falls, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/832,602

(22) Filed: Mar. 31, 1997

Related U.S. Application Data

(63) Continuation of application No. 07/973,593, filed on Nov. 9, 1992, now abandoned, which is a continuation-in-part of application No. 07/767,577, filed on Sep. 30, 1991, now abandoned, which is a continuation of application No. 07/274,586, filed on Nov. 22, 1988, now abandoned.

(51) Int. Cl.[7] .................................................. H01K 1/50
(52) U.S. Cl. ....................................... 313/579; 313/637
(58) Field of Search ............................... 313/548, 557, 313/579, 637; 536/27.14, 28.2; 514/49, 50, 51

(56) References Cited

U.S. PATENT DOCUMENTS

| | | | |
|---|---|---|---|
| 3,539,837 A | * 11/1970 | Van Der Linden et al. . | 313/557 |
| 3,586,896 A | * 6/1971 | Meijer et al. ................ | 313/579 |
| 3,712,701 A | * 1/1973 | Johnston et al. ............ | 313/594 |
| 3,800,180 A | * 3/1974 | De Fraeye et al. ..... | 313/579 X |
| 3,817,982 A | * 6/1974 | Verheyden et al. ........... | 536/23 |
| 4,074,168 A | * 2/1978 | T'Jampens ................... | 313/579 |
| 4,629,935 A | * 12/1986 | Keenan ....................... | 313/579 |
| 4,629,936 A | * 12/1986 | Weld et al. ................. | 313/579 |
| 4,659,318 A | * 4/1987 | Bunk et al. .................. | 445/54 |
| 4,748,376 A | * 5/1988 | Weld et al. ................. | 313/579 |
| 4,777,404 A | * 10/1988 | Keesel et al. ............... | 313/579 |
| 4,880,782 A | * 11/1989 | Eckstein ...................... | 514/46 |

FOREIGN PATENT DOCUMENTS

| | | | |
|---|---|---|---|
| DE | 2409415 | * | 8/1975 |
| DE | 133493 | * | 10/1977 |

OTHER PUBLICATIONS

Yarchoan et al., NEI of Med., vol. 316, pp. 1–8, Feb. 26,1987.*

* cited by examiner

*Primary Examiner*—Vip Patel
(74) *Attorney, Agent, or Firm*—Fay, Sharpe, Fagan, Minnich & McKee, LLP

(57) ABSTRACT

Tungsten-halogen lamps capable of satisfactory operation at relatively high temperatures exceeding 250° C. which comprise a high temperature glass or quartz envelope enclosing a tungsten filament and molybdenum, contain a fill comprising a mixture of noble gas, hydrogen, phosphorus, chlorine, and bromine. In a preferred embodiment the chlorine and bromine will be supplied by a single carbon atom hydrocarbon compound containing both halogens such as $CHCl_2Br$ and $CH_2BrCl$.

12 Claims, 3 Drawing Sheets

FILL FOR HIGH TEMPERATURE TUNGSTEN-HALOGEN LAMPS

This application is a continuation of Ser. No. 07/973,593 filed Nov. 9, 1992 now abandoned which is a continuation-in-part of U.S. Ser. No. 07/767,577, filed Sep. 30, 1991, now abandoned, which is a continuation of U.S. Ser. No. 07/274,586, filed Nov. 22, 1988 now abandoned.

BACKGROUND OF THE INVENTION

1. Field of the Invention

This invention relates to a fill suitable for use with tungsten halogen lamps which operate at relatively high temperatures and lamps using same. More particularly, this invention relates to a tungsten halogen lamp which operates at a temperature of at least about 250° C. and which comprises a hermetically sealed, light transmissive, vitreous envelope containing a tungsten filament, molybdenum and a fill, said fill comprising inert gas, hydrogen, phosphorus, chlorine and bromine.

2. Background of the Disclosure

Tungsten halogen lamps which comprise a hermetically sealed vitreous, light transmissive envelope enclosing a tungsten filament and containing a fill comprising a halogen gas are well known to those skilled in the art. These lamps operate on a tungsten-halogen cycle which is a regenerative, continuous process in which a halogen containing tungsten compound is produced when the halide combines chemically with particles of tungsten evaporating from an incandescent tungsten filament. Subsequent thermal decomposition of these so formed halogen containing tungsten compounds at the filament returns the tungsten particles back to the filament. For the most part, one or more bromine compounds are used for the halide fill in such lamps along with an inert gas, such as argon. Phosphorus or phosphorus compounds which act as oxygen getters are also employed in the fill. Bromine compounds known to be useful for such fills include hydrogen bromide HBr, methyl bromide $CH_3Br$, dibromomethane $CH_2Br_2$ and bromoform $CHBr_3$. Thus, U.S. Pat. No. 3,712,701 discloses the use of hydrogen bromide as well as these bromine containing single carbon atom hydrocarbon compounds. This patent also discloses the use of phosphonitrilic bromides. U.S. Pat. No. 4,629,935 discloses a fill consisting of a mixture of phosphine and methyl bromide wherein the mass ratio of the carbon to the phosphorus in the fill resulting from such compounds ranges from about 4/1 to about 1/1. It is also known that the use of carbon containing compounds in tungsten-halogen lamps can result in the tungsten filament becoming brittle due to the presence of the carbon in the lamp. This embrittlement becomes particularly significant in filaments made of fine tungsten wire having a diameter of less than 0.005 inches and U.S. Pat. No. 4,629,936 suggests various ratios of phosphorus compounds to carbon containing compounds, along with the presence of yellow phosphorus in the lamp, as a possible solution to this problem. The example in this patent employed a mixture of yellow phosphorus, methyl bromide and phosphine, but the amounts of these materials used in the fill are not given. The preferred phosphorus to carbon mass ratio was said to be 8 to 1.

U.S. Pat. No. 4,748,376 discloses that additional problems occur with tungsten halogen lamps when the lamps operate at relatively cool temperatures such that the interior wall surface of the vitreous envelope is less than 200° C. The operation of such lamps at such low temperatures is disclosed in this patent as resulting in premature blackening of the glass envelope. Such blackening is believed to be from tungsten transfer from the filament onto the inner envelope surface due to failure of the tungsten cycle. This problem is overcome by using a fill in the envelope which includes bromine, phosphorus, carbon and an inert gas, with a phosphorus to carbon mass ratio in the range of approximately 10/1 to 1/1. Phosphine, methyl bromide, dibromomethane, bromoform and cyanogen ($C_2N_2$) are disclosed as being suitable as components of the lamp fill. This patent also discloses that adding too much phosphine to the fill also results in lamp darkening.

SUMMARY OF THE INVENTION

It has now been discovered that wall blackening and tungsten filament embrittlement for tungsten-halogen lamps containing molybdenum and tungsten and which operate at relatively high temperatures of at least about 250° C. may be substantially reduced by employing a fill comprising inert gas, hydrogen, phosphorus, chlorine and bromine. Thus, the present invention relates to a tungsten-halogen lamp comprising a hermetically sealed, light transmissive, vitreous envelope containing a tungsten filament, molybdenum and a fill, said fill comprising inert gas, hydrogen, phosphorus, chlorine and bromine. The mole ratio of phosphorus to halogen (chlorine and bromine) will range from about 1–2. It is preferred that the inert gas comprise a mixture of nitrogen and noble gas when employed with a lamp that operates at relatively high voltage. In a preferred embodiment the fill will include a hydrocarbon compound containing a single carbon atom, bromine and chlorine. The vitreous envelope may be made of a suitable high temperature type of aluminosilicate glass or quartz. By relatively elevated temperature is meant that the interior surface of the vitreous envelope will be at a temperature of at least about 250° C. In general, the temperature will range from about 250 up to as much as 900° C. in the case of a lamp having a quartz envelope and up to about 600° C. for a lamp having a glass envelope, with temperatures of from about 350–450° C. being typical for lamps with glass envelopes and temperatures up to about 800° C. for lamps with quartz envelope. However, the lamps of this invention will also work at temperatures below 250° C.

DETAILED DESCRIPTION

Figure 1:
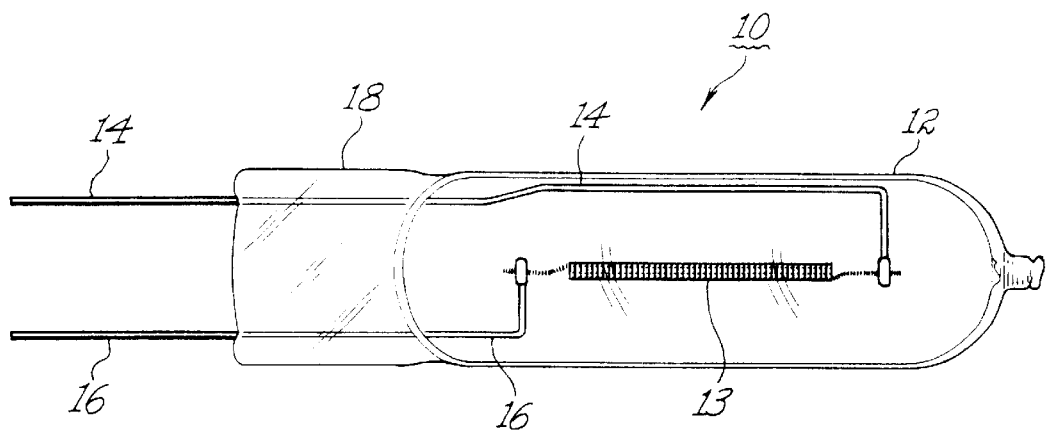
FIG. 1 is a schematic drawing of a tungsten-halogen lamp useful in the practice of the present invention wherein the lamp envelope is made of a high temperature glass.
Figure 2:
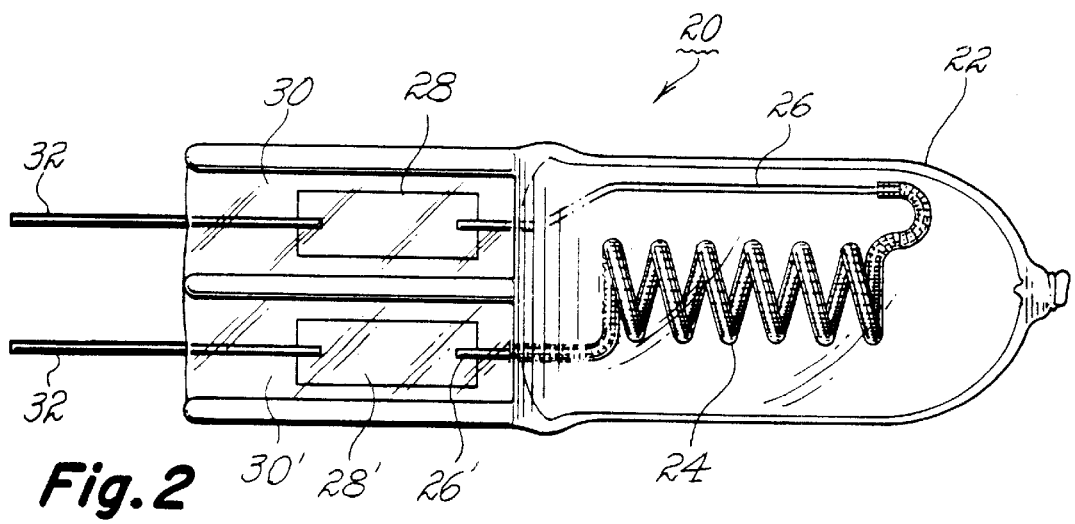
FIG. 2 is a schematic drawing of another embodiment of a tungsten-halogen lamp useful in the practice of the invention wherein the envelope is made of quartz.

FIGS. 1 and 2 illustrate two different embodiments of a tungsten-halogen lamp containing a fill in accordance with the present invention. It is understood that these lamps are merely representative of only two of many different varieties and configurations of tungsten-halogen lamps capable of successfully utilizing the fill of the present invention. Accordingly, the scope of the invention is not to be limited to the particular lamps as shown and described herein below.

Referring to FIG. 1, lamp 10 has a tubular envelope made of a suitable light transmissive vitreous envelope 12 formed from a high temperature aluminosilicate glass which may be of the type disclosed and claimed in U.S. Pat. No. 4,737,685 the disclosures of which are incorporated herein by reference. A tungsten filament 13 is connected to and supported within said vitreous envelope by inlead wires 14 and 16 made of molybdenum and which extend through a customary pinch seal 18. If desired, molybdenum inleads 14 and 16 can be connected by means of welding, brazing or other suitable means to less costly metals of a greater or the same diameter to provide electrical connection for the filament and support for the lamp. Envelope 12 also contains a fill comprising a mixture of nitrogen, hydrogen, noble gas, phosphorus, chlorine and bromine.

FIG. 2 illustrates another type of tungsten-halogen lamp useful in the practice of this invention wherein molybdenum foil is used to effect a hermetic seal in the pinch seal area, as is the practice with such lamps having quartz envelopes. Thus, lamp 20 comprises quartz envelope 22 containing two pinch-sealed inlead constructions comprising outer terminal leads 32 and 32' and inner terminal leads 26 and 26' connected to opposite ends of intermediate molybdenum sealing foils 28 and 28', respectively. Tungsten filament 24 is attached at one end to inner lead 26 and at the other end to inner lead 26'. The leads are connected to the molybdenum sealing foils by suitable means, such as welding. Leads 26 and 26' are made of molybdenum. Envelope 22 also contains a fill comprising a mixture of noble gas, hydrogen, phosphorus, chlorine, bromine and optionally, nitrogen.

In both of the embodiments set forth above, the lamp envelope encloses both tungsten and molybdenum which are exposed to the gaseous fill at the high temperatures involved during operation of the lamp. The aluminosilicate glass envelope may be used up to a temperature of about 600° C., whereas the quartz may be used at temperatures as high as about 950° C., but more typically about 800° C. Temperature in this context refers to the inner wall temperature of the glass envelope. However, it should be understood that the present invention will work at temperatures below 250° C. Accordingly, although lamps useful in the practice of this invention are useful up to temperatures of about 600° C. for the case of a high temperature glass envelope and up to at least about 800° C. and even 950° C. in the case of a quartz envelope, the invention is not intended to be restricted to lamps operating at such high temperatures.

As set forth above, it is essential that the fill include both bromine and chlorine along with phosphorus, hydrogen and inert gas. The source of the bromine and chlorine may be bromine gas, chlorine gas, HBr and HCl, but as a practical matter one or more hydrocarbon compounds containing one or both of these halogens will be used because of the toxicity and corrosivity of $Br_2$, HBr, $Cl_2$ and HCl. Illustrative, but non-limiting examples of halogenated hydrocarbon compounds useful in the practice of this invention include $CH_3Br$, $CH_2Br_2$, $CHBr_3$, $CH_3Cl$, $CH_2Cl_2$, $CHCl_3$, $CH_2ClBr$ and $CHCl_2Br$. Thus, one or more of these compounds may be employed along with, i.e., HCl and/or HBr if desired.

The phosphorus may be added in the form of yellow or red elemental phosphorus or in the form of a phosphorus containing compound. Thus, yellow or red phosphorus may be introduced directly into the interior of the lamp envelope or a suitable phosphorus containing compound such as phosphine $PH_3$ may be added. Phosphine is particularly preferred because it is a gas at room temperature and pressure and can be accurately mixed and diluted with an inert gas and the mixture introduced into the lamp envelope. In one method of lamp manufacture the phosphine is mixed with inert gas and this mixture, along with the halogenated hydrocarbon is introduced into the interior of the filament enclosing lamp envelope and the lamp is then sealed. In another method of lamp manufacture, it has been found convenient to introduce a mixture of phosphine and inert gas into the lamp and energize the filament to crack the phosphine into phosphorus and hydrogen. The phosphorus coats the interior surface of the lamp envelope as elemental phosphorus. The nitrogen and hydrogen are then removed and the remainder of the fill including inert gas, halogen and hydrogen are added. As a practical matter the hydrogen will be introduced as one of the constituent atoms of the halogenated hydrocarbon compounds or compound and/or HBr and HCl in this method of manufacture. The presence of hydrogen within the lamp envelope has been found to be necessary in order to stabilize the halogen.

As set forth above, it is essential and critical to the present invention that the lamp fill contain both chlorine and bromine. Tungsten halogen lamps were made employing only the well known methyl bromide $CH_3Br$, along with $PH_3$, $N_2$ and Xe. These lamps exhibited wall blackening or darkening resulting from deposition of the molybdenum on the interior surface of the lamp envelope after less than 1000 hours of lamp operation. That is, lamp lumens were substantially reduced due to deposition of black metallic molybdenum on the interior wall surface of the lamp envelope. This molybdenum metal is transferred onto the inner surface of the lamp envelope from the molybdenum leads supporting the tungsten filament. Increasing the phosphine content in the fill has been found to reduce the molybdenum blackening, but will not reduce it to an acceptable amount before the increased phosphine dose results in tungsten blackening.

Moreover, the use of only methyl bromide for the sole source of halogen in the fill resulted in substantial embrittlement of the tungsten filament and lamps containing only this halogen failed an impact break test after two hours burning time. The filament break test is conducted by inserting a lamp into a weighted fixture at the end of a rod and subjecting same to a pendulum impact test, wherein the angle of elevation of the rod at which the filament breaks when released to swing down to a stop is taken as a measure of the filament embrittlement. Using only methyl bromide for the halogen resulted in lamps breaking at an angle of from 45–60°. In contrast, filaments in the same type of lamp, but which employed a single hydrocarbon compound in the fill which contained both chlorine and bromine according to a preferred embodiment of the invention didn't break until an angle of approximately 90° was reached after two hours of burning time.

A mixture of the two compounds methyl bromide $CH_3Br$ and methyl chloride $CH_3Cl$ in the lamp fill prevented substantial blackening from both molybdenum and tungsten at lamp temperatures of about 350–400° C. However, carbon embrittlement of the filament was increased due to the presence of too much carbon in the lamp resulting from the relatively low ratio of halogen to carbon of 1/1. Accordingly, in the practice of the present invention it is preferred that the halogen to carbon mole ratio exceed 1/1 and preferably be at least about 2/1 if carbon is present.

The mole ratio of phosphorus to halogen in the lamp fill is also important to the operation of the present invention. The mole ratio of phosphorus to halogen (chlorine plus bromine) will range from 1–2 moles of phosphorus per mole of halogen depending on the type of the lamp. That is, most tungsten halogen lamps having quartz envelopes operate at lower voltages (i.e., 12 volts) and higher temperatures than lamps having envelopes made of high temperature glass (i.e., 120 volts). The amount of phosphine or phosphorus in the fill will range from about 0.02 to 0.12 mole % and more preferably from about 0.04 to 0.08 mole % of the total fill. Again, the actual amount will depend on the lamp type.

As set forth above the fill must also contain inert gas. By inert gas is meant one or more noble gases and, in high voltage lamps, a mixture of one or more noble gases with a gas which prevents arcing of the filament. Lamp fills containing only one or more noble gases as the inert gas are satisfactory with relatively low voltage lamps (i.e., 12 V) and lamps in which the filaments are not tightly wound. However, in relatively high voltage lamps (i.e., 120 V) and in lamps in which the filament is tightly wound having relatively small turn-to-turn distances, the voltage drop from turn-to-turn is high and a gas which aids to prevent arcing between filament turns is necessary. Filament arcing and arc-out is well known in the lamp industry and results in one or more sections of the filament opening due to tungsten erosion from the arc, with the result that the lamp becomes inoperative due to the open circuit resulting from the filament burn out. Nitrogen has been found to be an effective gas for use in the present invention to prevent filament arcing. Accordingly, it has been found that, depending on lamp type, the amount of nitrogen in the fill will broadly range from about 0–20 mole % of the total fill, more generally 0.5–10 mole % and preferably from about 3 to 6 mole %. The amount of noble gas in the fill may range from about 80 to 99.8 mole %. Noble gases generally used in tungsten halogen lamps include xenon, krypton, argon, and even helium. Xenon, krypton and argon are preferred.

Tungsten-halogen lamps made according to the practice of the present invention have exhibited optimum results when both the chlorine and bromine are part of a single carbon atom halogenated hydrocarbon. Two single carbon atom hydrocarbon compounds or methane derivatives containing both chlorine and bromine that have been successfully employed in the practice of the present invention are dichlorobromomethane $CHCl_2Br$ and bromochloromethane $CH_2ClBr$ of which $CHCl_2Br$ is most preferred. Thus, in one embodiment of the present invention the tungsten-halogen lamp will contain a fill which comprises a mixture of phosphine, inert gas, $CHCl_2Br$ and/or $CH_2ClBr$. In another embodiment the fill will comprise a mixture of P, $H_2$, inert gas, $CHCl_2Br$ and/or $CH_2ClBr$ with all or a portion of the hydrogen coming from the hydrocarbon. In a preferred embodiment the lamp fill will contain $CHCl_2Br$. In a particularly preferred embodiment the fill will comprise P, $H_2$, inert gas and at least one compound selected from the group consisting essentially of $CHCl_2Br$ and $CH_2ClBr$.

The amount of dichlorobromomethane if employed as the source of halogen will broadly range from about 0.007–0.04 mole % of the total fill. In high voltage lamps the range will be about 0.007–0.025 mole % of the total fill and preferably from 0.009–0.017 mole %. If only chlorobromomethane is used, it will be present in the fill in an amount broadly ranging from about 0.010–0.15 mole % and preferably from about 0.015 to 0.030 mole %. It is understood of course that mixtures of these two hydrocarbons can be employed as well as mixtures of these hydrocarbons with other compounds and such as HBr, $CH_3Br$, $CH_2Br_2$, $CHBr_3$, HCl, $CH_3Cl$, $CH_2Cl_2$ and $CHCl_3$. However, it is most particularly preferred that $CHCl_2Br$, $CH_2ClBr$ and mixtures thereof be used as the sole source of halogen and particularly an embodiment wherein $CHCl_2Br$ contributes a majority of the halogen and more preferably all of the halogen. Thus, it can be seen that in this embodiment that the mole ratio of halogen to carbon is greater than about 2/1 and ranges from at least about 2/1 to about 3/1.

These lamps generally contain a fill at a pressure ranging from about 3 to 10 atmospheres. In one particularly preferred embodiment lamps having glass envelopes have been made containing a fill, on a mole basis, of 0.08% $PH_3$, 0.013 % $CHCl_2Br$ and 5% $N_2$, with Xe making up the difference. $CH_2ClBr$ has been successfully used in a similar lamp and fill in an amount of 0.025 mole %.

EXAMPLES

Example 1

A number of single-ended tungsten-halogen lamps having molybdenum leads supporting the filament were made according to FIG. 1 and as described on page 5. These lamps were designed to operate at 50 watts and 120 volts. Sets of lamps were made having the fills set forth in Table 1 below. The lamps were energized and tested for filament embrittlement as a function of burning time according to the pendulum impact test described on page 8 of the application. The total volume in each lamp was 1.5 cm$^3$ and the total fill pressure was 4000 torr. In addition to the phosphine and halogen, each lamp contained 5 volume % nitrogen with the remainder being xenon. At least 5 lamps were used for each impact test. These lamps were also observed for molybdenum blackening as a function of burning time.

TABLE 1

| Lamp Set | Volume % $PH_3$ and Halogen in Fill | Mole Ratio Phosphorus to Halogen | Mole Ratio Halogen to Carbon |
|---|---|---|---|
| A | 0.05% $PH_3$ + 0.05% $CH_3Br$ | 1/1 | 1/1 |
| B | 0.04% $PH_3$ + 0.007% $CHCl_2Br$ | 1.9/1 | 3/1 |

TABLE 1-continued

| | Volume % | Mole Ratio | |
|---|---|---|---|
| Lamp Set | $PH_3$ and Halogen in Fill | Phosphorus to Halogen | Halogen to Carbon |
| C | 0.02% $PH_3$ + 0.013% $CHCl_2Br$ | 0.5/1 | 3/1 |
| D | 0.04% $PH_3$ + 0.013% $CHCl_2Br$ | 1/1 | 3/1 |

Figure 3:
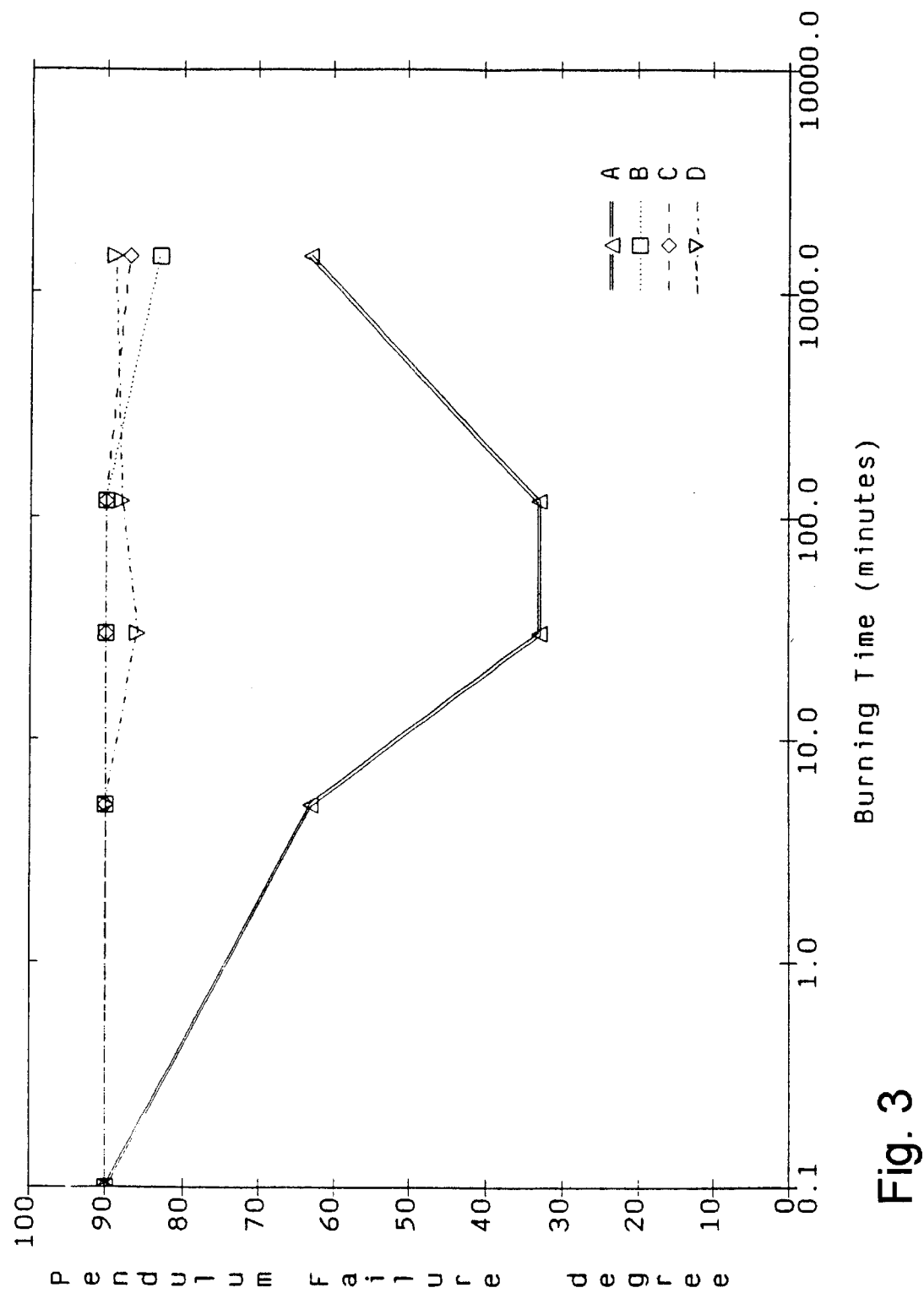
FIG. 3 is a graph illustrating filament embrittlement of prior art lamps compared to a lamp of the invention.

The results of the pendulum test are summarized in FIG. 3 and dramatically show that the lamps of the invention having both chlorine and bromine and a halogen-to-carbon ratio greater than 1/1 have remarkably superior resistance to filament embrittlement as measured by the angle of pendulum failure for the pendulum impact test compared to the prior art lamp, which is lamp A. Thus, the prior art lamp containing only methyl bromide at a phosphorus to halogen mole ratio of 1/1 and a halogen to carbon mole ratio of only 1/1 exhibited substantially inferior filament embrittlement characteristics than the lamps of the invention. Five lamps were used to obtain each data point in this example.

Example 2

Additional sets of lamps were made of the type described above but having somewhat different fills (with the exception of the control A) and evaluated for lamp blackening. These lamps had the fills set forth in Table 2.

TABLE 2

| | Volume % | Mole Ratio | |
|---|---|---|---|
| Lamp Set | $PH_3$ and Halogen in Fill | Phosphorus to Halogen | Halogen to Carbon |
| A | 0.05% $PH_3$ + 0.05% $CH_3Br$ | 1/1 | 1/1 |
| E | 0.03% $PH_3$ + 0.05% $CH_3Br$ | 0.6/1 | 1/1 |
| F | 0.075% $PH_3$ + 0.05% $CH_3Br$ | 1.5/1 | 1/1 |
| G | 0.06% $PH_3$ + 0.017% $CHCl_2Br$ | 1.2/1 | 3/1 |

With regard to the lamps made in Table 2, one-third of the prior art lamps A containing 0.05 volume % phosphine and 0.05 volume % methyl bromide blackened after burning for only about 300 hours, due to transport of molybdenum to the glass wall. Although these lamps had a phosphorus-to-halogen mole ratio of 1/1, the halogen-to-carbon mole ratio was only 1/1. With respect to Set E, three-fourths of the lamps blackened after only 300 hours of operation. In Set F, one-fifth of the lamps blackened after 300 hours of operation. In marked contrast, the lamps of the invention, Set G, showed no lamp blackening after even 1500 hours of lamp operation. Further, the other lamps of the invention, lamps B, C and D in Table 1, also exhibited no blackening after 2000 hours of operation. As with Example 1, five lamps were burned to obtain each data point.

Example 3

The lamps used in this example were similar to those used in the examples above, except that one set, GH45, was operated at 120 V and 45 watt, while the other set GH51 was operated at 120 V and 50 watt and had an infrared reflecting coating on the outside surface of the filament chamber. The lamp fills all contained 5% nitrogen, remainder xenon, with the phosphorus and halogen contents listed in Table 3 below.

TABLE 3

| Lamp Type | $PH_3$ and Halogen in Fill | Volume % Phosphorus to Halogen Mole Ratio |
|---|---|---|
| GH45 | 0.026% $PH_3$ + 0.01% $CHCl_2Br$ | .9/1 |
| " | 0.037% $PH_3$ + 0.01% $CHCl_2Br$ | 1.2/1 |
| " | 0.08% $PH_3$ + 0.01% $CHCl_2Br$ | 2.6/1 |
| GH51 | 0.02% $PH_3$ + 0.013% $CHCl_2Br$ | 0.5/1 |
| " | 0.04% $PH_3$ + 0.013% $CHCl_2Br$ | 1/1 |
| " | 0.04% $PH_3$ + 0.007% $CHCl_2Br$ | 1.9/1 |

Figure 4:
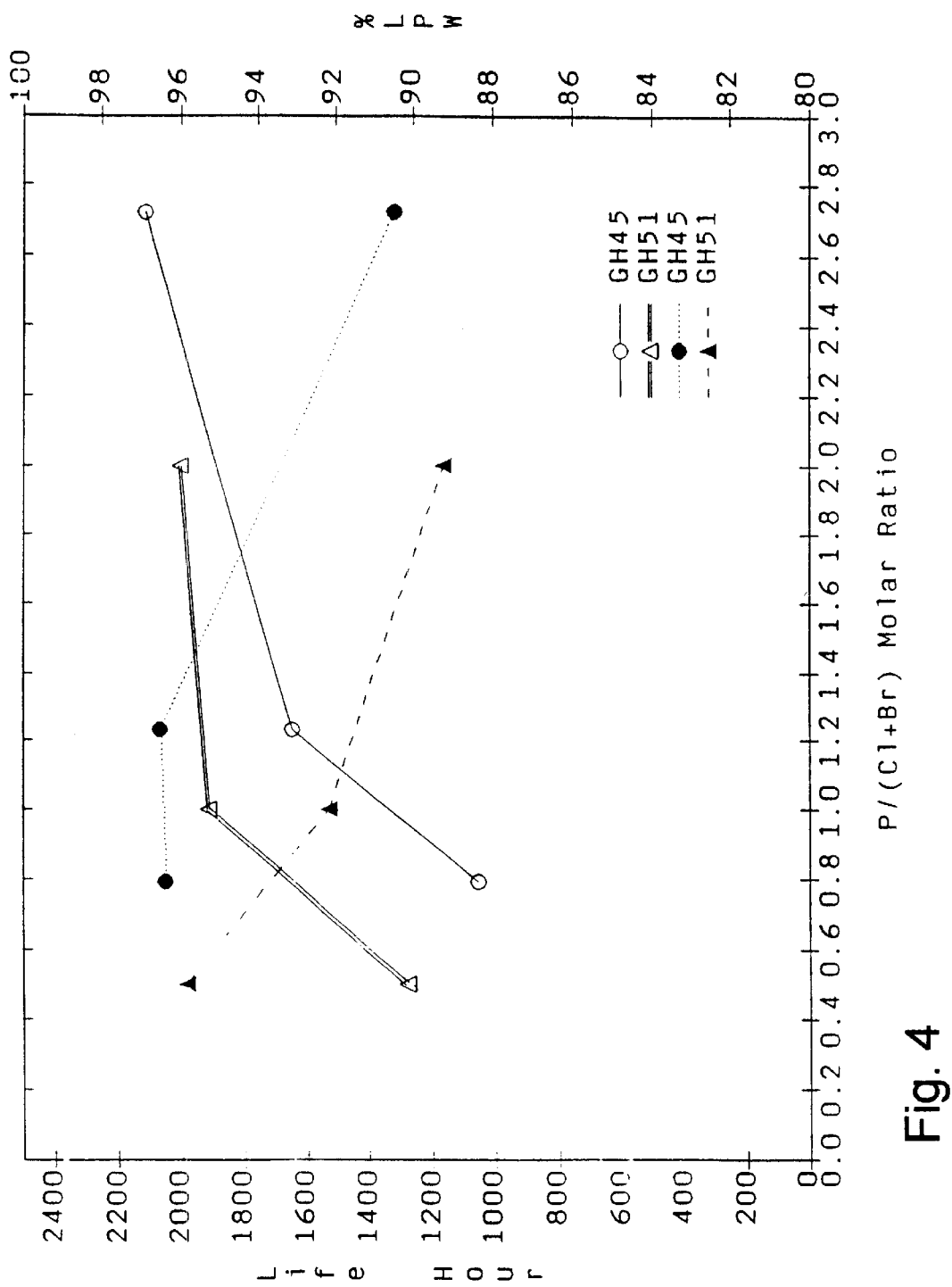
FIG. 4 graphically illustrates lamp life and lumen output of lamps according to the invention and prior art lamps as a function of the ratio of phosphorus to halogen.

The results are plotted in FIG. 4 and clearly show a substantial reduction in lamp life when the phosphorus to halogen ratio is below 1/1 and about a 10% reduction in lumens per watt light output when the phosphorus to halogen ratio is greater than 2/1. The Δ represents the horizontal life for the GH51 lamp type. The ○ represents the horizontal life for the GH45 lamp type. The ● represents the percent lumen per watt for the GH45 lamp type. The ♦ represents the percent lumen per watt for the GH51 lamp type.

What is claimed is:

1. A tungsten-halogen lamp comprising a light transmissive vitreous envelope enclosing a tungsten filament and at least one molybdenum inlead connected to said filament and containing a fill which comprises a mixture of carbon, hydrogen, xenon, phosphorus, chlorine, bromine, and nitrogen, wherein the mole ratio of the combined total of said chlorine and bromine to said carbon in said lamp is greater than 1/1, wherein the source of said chlorine and bromine is one or more of $Br_2$, $Cl_2$, HCl, HBr, $CH_2ClBr$, and $CHCl_2Br$, and wherein the mole ratio of said phosphorus to said chlorine and bromine ranges from about 1–2, said lamp exhibiting less molybdenum blackening and filament embrittlement than if chlorine was not present.

2. The lamp of claim 1 wherein said nitrogen is present in an amount not exceeding about 20 mole percent.

3. A tungsten-halogen lamp comprising a hermetically sealed light transmissive, vitreous envelope enclosing a tungsten filament and at least one molybdenum inlead connected to said filament and containing a fill which comprises a mixture of xenon, phosphorus, hydrogen, chlorine, bromine, carbon, and nitrogen, wherein the mote ratio of the combined total of said chlorine and bromine to said carbon in said lamp is greater than 1/1, wherein the source of said chlorine and bromine is one or more of $Br_2$, $Cl_2$, HCl, HBr, $CH_2ClBr$, and $CHCl_2Br$, and wherein the mole ratio of said phosphorus to chlorine and bromine ranges from about 1–2, said lamp exhibiting less molybdenum blackening and filament embrittlement than if chlorine was not present.

4. The lamp of claim 3 wherein the mole ratio of the combined total of said chlorine and bromine to said carbon in said lamp is at least about 2/1.

5. The lamp of claim 3 wherein the amount of said phosphorus in said fill ranges from about 0.004 to 0.20 mole percent.

6. The lamp of claim 5 wherein said carbon comprises a single carbon atom hydrocarbon compound.

7. The lamp of claim 3 wherein said nitrogen is present in an amount no greater than about 20 mole percent.

8. A tungsten-halogen lamp comprising a hermetically sealed, light transmissive envelope of quartz or high temperature glass which encloses a filament supported by molybdenum inleads and which contains a fill consisting essentially of a mixture of xenon, phosphorus, hydrogen, carbon, chlorine, bromine, and nitrogen, wherein the source of said chlorine and bromine is one or more of $Br_2$, $Cl_2$, HCl, HBr, $Cl_2ClBr$, and $CHCl_2Br$, and where the mole ratio of the combined total of said chlorine and bromine to said carbon in said lamp is at least 1/1 and wherein the mole ratio of said phosphorous to said chlorine and bromine ranges from about 1–2, said lamp exhibiting less blackening and filament embrittlement than if said chlorine was not present.

9. The lamp of claim 8 wherein said hydrocarbon is selected from the group consisting of $CHCl_2Br$, $CH_2ClBr$, and mixtures thereof.

10. The lamp of claim 9 wherein the mole ratio of said chlorine and bromine to said carbon is at least 2/1.

11. The lamp of claim 9 wherein said nitrogen is present in an amount up to about 20 mole percent.

12. The lamp of claim 11 wherein said phosphorus is present in an amount of 0.004 to 0.20 mole percent of said fill.

* * * * *